United States Patent
Dussud et al.

(10) Patent No.: US 7,801,872 B2
(45) Date of Patent: Sep. 21, 2010

(54) PROVIDING A PUBLISHING MECHANISM FOR MANAGED OBJECTS

(75) Inventors: Patrick H. Dussud, Redmond, WA (US); Maoni Z. Stephens, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 12/099,481

(22) Filed: Apr. 8, 2008

(65) Prior Publication Data

US 2009/0254596 A1    Oct. 8, 2009

(51) Int. Cl.
G06F 17/30 (2006.01)
(52) U.S. Cl. .................................. 707/704; 707/814
(58) Field of Classification Search ................. 707/704, 707/814
See application file for complete search history.

(56) References Cited

U.S. PATENT DOCUMENTS

| | | | | |
|---|---|---|---|---|
| 5,701,470 A * | 12/1997 | Joy et al. | | 707/692 |
| 5,940,827 A * | 8/1999 | Hapner et al. | | 707/703 |
| 6,016,495 A * | 1/2000 | McKeehan et al. | | 707/703 |
| 6,122,640 A * | 9/2000 | Pereira | | 707/648 |
| 6,324,631 B1 | 11/2001 | Kuiper | | |
| 6,510,437 B1 * | 1/2003 | Bak et al. | | 707/783 |
| 6,542,891 B1 * | 4/2003 | Loen et al. | | 717/118 |
| 6,625,602 B1 * | 9/2003 | Meredith et al. | | 707/703 |
| 6,745,213 B2 * | 6/2004 | Seidl et al. | | 707/813 |
| 6,892,200 B2 * | 5/2005 | Eich | | 707/704 |
| 6,898,611 B1 | 5/2005 | Dussud et al. | | |
| 6,978,285 B2 | 12/2005 | Li | | |
| 7,035,870 B2 * | 4/2006 | McGuire et al. | | 707/704 |
| 7,127,480 B2 * | 10/2006 | Kline et al. | | 711/162 |
| 7,136,887 B2 * | 11/2006 | Garthwaite et al. | | 707/813 |
| 7,149,870 B2 | 12/2006 | Blandy | | |
| 7,293,051 B1 * | 11/2007 | Printezis et al. | | 707/814 |
| 2006/0101468 A1 | 5/2006 | Massarenti et al. | | |
| 2006/0259528 A1 | 11/2006 | Dussud et al. | | |
| 2007/0022268 A1 | 1/2007 | Stephens | | |
| 2007/0203960 A1 | 8/2007 | Guo | | |
| 2007/0255775 A1 | 11/2007 | Manolov et al. | | |

OTHER PUBLICATIONS

Pattison, Ted, "Objects and Values, Part 2: Memory Management", MSDN Magazine The Microsoft Journal for Developers, Oct. 2002, 9 pages.

Pratschner, Steven, Steven Pratschner's .Net CF WebLog, "An Overview of the .Net Compact Framework Garbage Collector", Jul. 2004, 4 pages.

(Continued)

Primary Examiner—Wilson Lee
Assistant Examiner—Kim T Nguyen
(74) Attorney, Agent, or Firm—Workman Nydegger

(57) ABSTRACT

Publishing an object. Memory for an object may be reserved so as to lock the memory from being access by garbage collection threads or other user threads. While the lock is in place, type and size information can be installed for the object. If the reservation is being made to allow garbage collection threads to operate on the object, then the type may be a specialized type that indicates that the object has no references. Reservations can also be made to allow the intended type information to be installed for the object. An indication can be made that the object is well formed, thus unlocking the object and allowing garbage collection threads, other user threads, or both to access the object. The locking and unlocking may be performed by accessing an API provided by a system garbage collector.

16 Claims, 2 Drawing Sheets

OTHER PUBLICATIONS

Arnold, Dave, et al., "Using the .NET Profiler API to Collect Object Instances for Constraint Evaluation", .Net Technologies 2006, 8 pages.

Kukreja, Amit, et al., "Garbage collection in .NET" C# Help, Based on information and belief available, at least as early as Dec. 4, 2007, 7 pages.

* cited by examiner

PROVIDING A PUBLISHING MECHANISM FOR MANAGED OBJECTS

BACKGROUND

Background and Relevant Art

In computer systems, there is often a need to manage memory. In particular, when objects are no longer used, it is useful to recover memory that was allocated for use with the objects. Some systems in use today use explicit memory management whereby the systems use a command to allocate memory and a corresponding command to free memory. For example, the C programming language includes a command "malloc" that can be used to allocate memory for an object and a command "free" that can be used to free memory that has been previously allocated. However, this type of memory allocation and de-allocation suffers from a number of drawbacks. In particular, free memory may be scattered throughout a memory structure. Additionally, this type of allocation and de-allocation allows for malicious attacks that can be used to compromise data. For example, a hacker can cause memory that has been allocated by one thread to be de-allocated such that a malicious thread can change or access data stored in the memory.

To combat these drawbacks, a system has been created using automatic memory management where the system includes garbage collectors for identifying objects that are being used and objects that are no longer being used. Memory for the objects no longer being used can be identified as free memory such that the memory can be used for the creation of new objects. Typical garbage collection involves marking objects that are in use by marking objects that can be reached beginning at a reference by a root and reclaiming memory for any objects that are not marked by sweeping the heap. Marking can occur by setting (or clearing) a flag (such as a single bit) in the object. After sweeping the heap, all flags for the objects are cleared (or set) such that subsequent garbage collection can take place.

Marking objects and reclaiming non-marked objects can be a time consuming process. Some systems have been implemented where all other processes must stop while garbage collection activities are being performed. However, it is often desirable to perform garbage collection activities while allowing other processes to continue so as to reduce the performance degradation caused by garbage collection activities. Some presently implemented systems accomplish this functionality by creating a snapshot of some or all objects and marking objects in the snapshot while the system is allowed to continue to access the objects for reading the objects or updating the objects. Marking is then performed based on the snapshot. While it can be appreciated that some objects may become free after the snapshot, it should also be appreciated that memory for these objects can be swept using a subsequent snapshot in subsequent garbage collection activities.

Modern computer systems typically include a number of different processors, whether actual or virtual, which allow a number of different threads of activities to be executing concurrently. In some such systems, multiple threads may be performing garbage collection activities concurrently. However, in some systems it may be necessary for one garbage collection thread to block activities of another garbage collection thread, or to block activities of another user thread that does not include garbage collection functionality. For example, some garbage collection threads may block other garbage collection threads when the garbage collection threads are clearing memory. Clearing memory may include, for example, writing zeros to bits in the memory. In particular, when performing certain operations, a garbage collection thread may block all accesses to the memory heap by other garbage collection threads. This may result in degradation of performance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes functionality for allowing garbage collection activities and allocation activities to be performed on an object. A computing environment may include programmatic code allowing threads to be configured to perform garbage collection functionality for freeing memory for use for other objects. A method may be implemented to allow allocation of memory for an object while allowing other threads to perform garbage collection tasks while the allocation tasks are being performed on the memory for the object. A method includes at an allocator thread, reserving memory for a first object, wherein reserving memory for the first object comprises indicating that the memory for first object is locked or inaccessible. At the allocator thread, an indication is provided of memory size for the memory for the first object. At the allocator thread, an indication is provided of a first type of the first object. The first type is a specialized type indicating that the object has no references to other objects. At the allocator thread, after the indication of memory size is provided, an indication is made that the memory for the first object is well formed, so as to unlock the memory, thus making the memory accessible to garbage collection threads. Thus, embodiments may include, at a different garbage collection thread, attempting to access the object. Attempting to access the object includes accessing the indication of the first type and the indication of memory size. At the different garbage collection thread, an act of jumping past the memory for the first object based the accessed size is performed.

Other embodiments may additionally include performing the locking an unlocking functionality described above on the object so as to allow for installing class information. Installing the class information allows the objects intended type to be set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
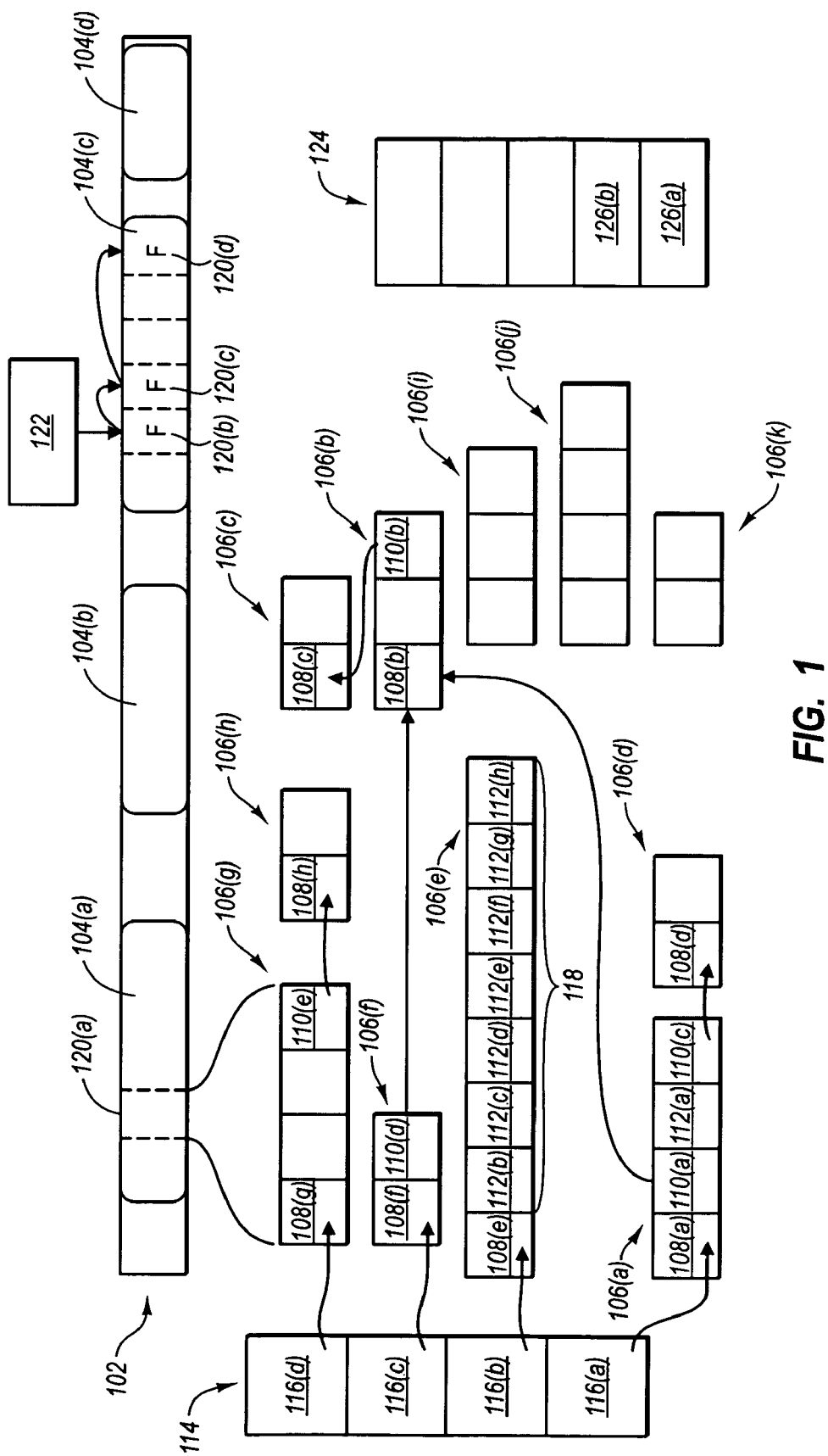
FIG. 1 illustrates various data structures implementing objects and garbage collection functionality.

Some embodiments described herein may be directed to performing object allocation activities in a fashion that allows threads to perform concurrent garbage collection activities. In particular, some embodiments implement functionality allowing processing of a large object heap even when large object allocations are concurrently happening at the large object heap.

When a garbage collector runs concurrently with user threads in a process, the garbage collector needs to examine managed objects. For example, the garbage collector may need to look at the object size to determine how to get to the next object. However, an object may not be in a state that can be examined. For example, and object may not yet be constructed to the point that can it be looked at. If the garbage collector happens to look at an object when it is not in an examinable state, it can cause undesirable consequences, such as an access violation. Some embodiments described herein allow a garbage collector to implement a publishing mechanism for an allocator to indicate to the garbage collector when a garbage collector can examine an object.

This allows large object allocations while the garbage collector is examining the large object heap concurrently. Additionally, this can be used as a general mechanism between the garbage collector and an allocator, or as a synchronization mechanism between allocating threads and other threads when they need to access the heap.

Embodiments may be implemented where the garbage collector provides application programming interfaces (APIs) for the allocator to declare when an object starts being in an unexaminable state and when it finishes being in that state. When an object state becomes examinable, the object may be referred to as published, such that the object can now be looked at by the garbage collector. This may be implemented by mechanisms like holding an exclusive lock on the object and releasing the lock when the object calls the publishing API. On the allocator side, the allocator can improve performance by calling the publishing API as soon as it finishes constructing itself enough to be examined.

When the allocator detects that garbage collector is running concurrently it may put itself in a publishing mode, meaning that when it needs to allocate new objects on the large object heap (by either allocating within a free list item or extending the heap segment so it can use the newly committed memory), it needs to call an API that garbage collector provides to indicate it now puts itself in an unexaminable state and as soon as it finishes allocating the object it can call a publish object API that garbage collector provides to let garbage collector know it now can be examined by the garbage collector.

When garbage collector detects an object is in an unexaminable state it will wait for the object to publish itself to examine it. To minimize the time the object is in the unexaminable state the publish object API should be called soon after filling in the object header. In one embodiment, the common language runtime (CLR) guarantees that memory for newly constructed objects is always clear. As such a memory clearing process (which dominates the allocation) is done while the object is in an examinable state. To do this we publish the object as a free object first; clear the memory; then publish the object as what it was originally intended to be.

Referring now to FIG. 1, an example of various garbage collection activities and allocation activities are illustrated. FIG. 1 illustrates a large object heap 102. The large object heap 102 comprises system memory, such as system RAM or other system memory that can be used to store objects. The large object heap 102 includes a number of segments 104. Segments 104 may be assigned by the operating system for in storing managed objects. It should be noted that this point that references to designators in the Figures may be made generically or specifically when the Figures include more than one instance of an item illustrated. For example a generic reference may include a reference to segments 104 generically while a reference to a specific segment may include an additional designators appended to a reference such as is illustrated in FIG. 1 where the specific references to segments 104 include additional designators such that the specific references may be 104(a), 104(b), 104(c), and 104(d).

A segment 104 is a portion of the large object heap 102 that has been allocated by an operating system to store objects in memory spaces 120 for code running in the operating system environment. FIG. 1 further illustrates a number of objects 106 that may be stored in the segments 104.

An object 106 may include additional portions that vary from object to object. For example, an object 106 may include a header 108 that includes information about the object 106 including such information as class type, size, etc. The object 106 may include references 110 to other objects 106. Additionally an object 106 may include data members 112. Data members 112, such as data member 112(a) may include raw low level data, such as integers, Booleans, floating point numbers, characters, and strings.

Illustrating now garbage collection marking and sweep activities, FIG. 1 illustrates a root 114. The root 114 includes references to objects that are currently being used. To perform garbage collection, a reference in a root entry may be followed to an object. For example, the root reference 116(a) points to an object 106(a). In the example illustrated, the object 106(a) can then be marked to indicate that the object 106(a) is currently in use. In one embodiment, marking an object 106 as being currently in use may include setting a bit or clearing a bit in the header 108 of an object 106. Thus, in the example illustrated, a bit set aside for the purpose of marking an object may be set in the header 108(a) of object 106(a) to mark the object 106(a). Other data structures, such as bit tables or other tables may alternatively be used to mark objects 106.

Once an object 106 is accessed due to a reference by a root reference 116, then other references 110 in the object can be followed to mark other objects. For example, the reference 110(a) points to an object 106(b). Following the reference 110(a) allows the object 106(b) to be marked by setting a bit in the header 108(b) to indicate that the object 106(b) is currently in use. References 110 in the object 106(b) can be followed to find other objects 106 as well. For example, the object 106(b) includes a reference 110(b) that points to an object 106(c). Following the reference 110(b) to the object 106(c) allows the object 106(c) to be marked as being currently in use by setting a bit in the header 108(c).

Because the object 106(c) does not include references 110 to any other objects, Processing may then return to object 106(a) to follow the reference 110(c) to the object 106(d). Object 106(d) is then marked as being currently in use by setting a bit in the header 108(d). Because the object 106(d) does not include any references 110, processing can return to the root 114 to examine the root reference 116(b) which references an object 106(e). The object 106(e) can then be marked, by setting a bit in the header 108(d), as being currently in use. In this particular example, the object 106(e) includes an array 118 of data members 112(b)-112(h) Thus the object 106(e) does not include any references 110 to other objects 106. Processing therefore returns to the root 114 to examine the root reference 116(c). The root reference 116(c) points to an object 106(f). The object 106(f) is marked by setting a bit in the header 108(f) to indicate that the object 106(f) is in use.

The object 106(f) includes a reference 110(d). The reference 110(d) points to an object 106(b). At this point, a determination is made that the object 106(b) has already been marked and thus processing on this particular chain such that processing is returned to the root 114. In particular, it should be noted that processing may include checking a mark bit in a header 108 before marking an object 106. Thus, objects 106 that have already been marked can be discovered so as to economize system resources when performing marking operations.

At the root 114, a root reference 116(d) is referenced which points to an object 106(g). The object 106(g) is marked by setting a bit in the header 108(g). The object 106(g) includes a reference 110(e) which points to an object 106(h). The object 106(h) is marked by setting a bit in the header 108(h).

At this point, because the root 114 includes no further root references 116, and all of the objects referenced by root references 116 or references 110 in other previously referenced objects 106 have been followed, a sweep operation can be performed. It will be noted that FIG. 1 illustrates three objects object 106(i) object 106(j) and object 106(k) that have not been marked and are thus eligible to have their memory recovered for use for other objects. In one embodiment, this may be accomplished by marking memory space in segments 104 as free space. This is illustrated in segment 104(c) where memory spaces 120(b) 120(c) and 120(d) have been marked as free space.

While the example illustrated above has shown that objects 106 are traced and marked directly, marking may include the use of a mark stack 124. In particular, when an object 106 is reached due to following a reference, all of that objects references are placed on the mark stack 124 such that the mark stack 124 can be used to ensure that all of the appropriate mapping takes place.

For example, in the example illustrated in FIG. 1, following the root reference 116(a) to the object 106(a) results in references to the objects 106(b) and 106(d) referenced by 110(a) and 110(c) respectively being pushed onto the mark stack 124 as mark stack references 126(b) and 126(a) respectively. The reference 126(a) in the mark stack 124 to object 106(b) is then popped from the mark stack 124 to map to the object 106(b). When object 106(b) is mapped to, then a reference to object 106(c) is pushed to mark stack reference 126(a) of the mark stack 124 due to the reference 110(b). The reference in the mark stack to object 106(c) is popped from the mark stack, where after it is determined that object 106(c) has no references. Thereafter, the reference to object 106(d) is popped from the mark stack 124 where it is determined that object 106(d) has no references. Because the mark stack 124 is empty at this point, processing continues at the root reference 116(b) in the same fashion described above. Additionally, processing may further continue with root references 116(c) and 116(d) until all of the in use objects have been marked.

As can be imagined, when the mark stack 124 is limited in size, overflows of the mark stack 124 can occur. For example, consider a case where a mark stack 124 has 10 free entries, but a reached object 106 has 12 references. This condition can be detected and an indicator that the mark stack has overflowed can be provided. When this occurs, some systems look at and mark objects directly in the large object heap 102 by linear examination of the large object heap 102. For example, a garbage collector thread may begin examining a segment 104. When an overflow condition occurs, an object is discovered by linear examination beginning at a segment 104. A determination is made as to whether or not the object is marked. If the object is marked, then the garbage collector traces through the references of the object. If the object is not marked, the garbage collector jumps past the object (by jumping memory the size of the object as indicated by an object size) to begin examining further portions of the segment 104.

Other linear examination of the large object heap may also occur at the conclusion of a marking operation. In particular, as noted above, a snapshot is taken of memory at the beginning of a marking process. Marking is then performed as described above. As noted, after the snapshot, the objects are released such that user threads can modify the objects or create new objects while marking is taking place. If new objects and changes are not accounted for, when the memory is swept, some objects may be swept that should not be swept. To prevent this, a second snapshot is taken, and a linear examination of objects in the large object heap 104 is performed to discover any "dirty" i.e. changed or new objects.

Figure 2:
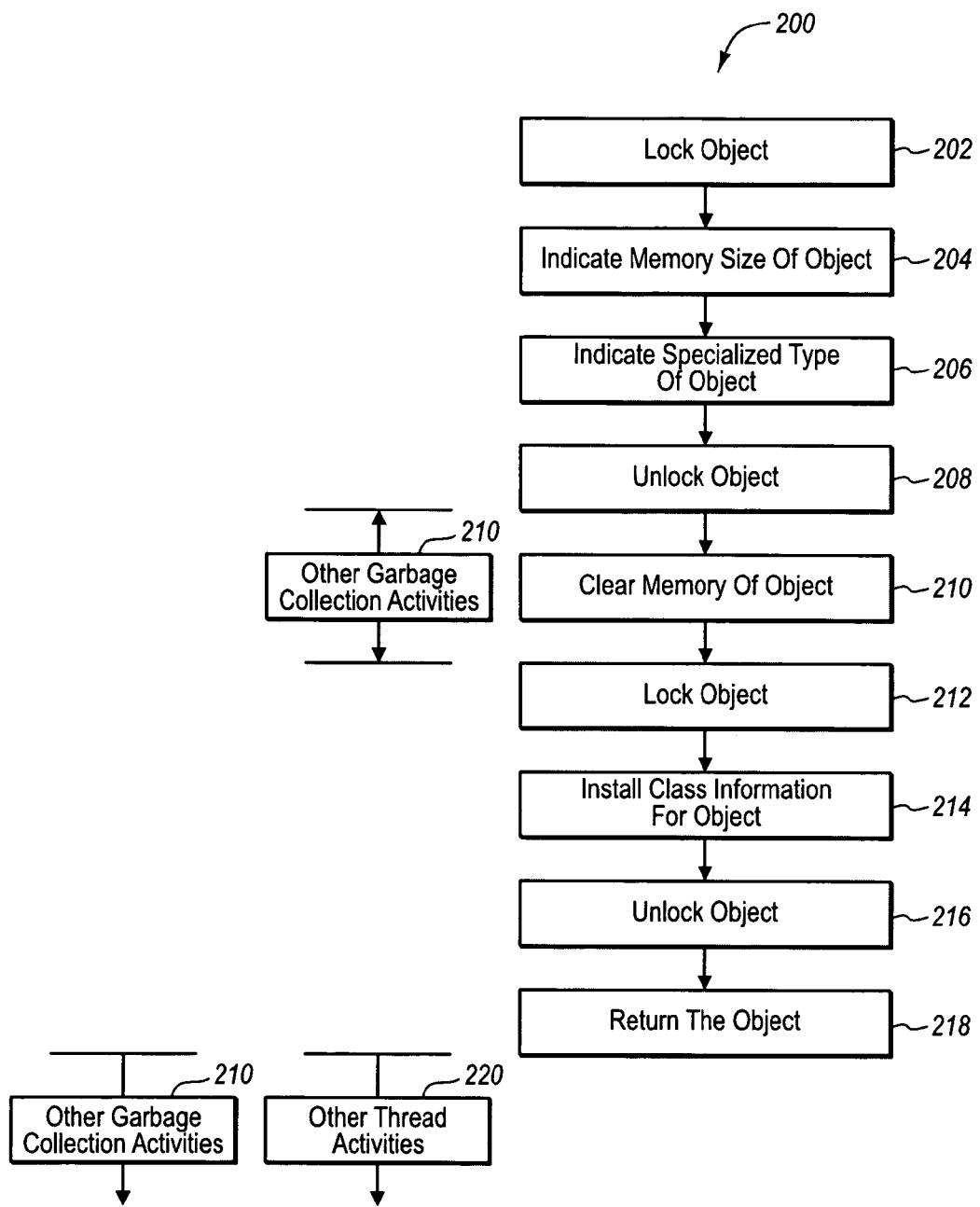
FIG. 2 illustrates a method of performing various garbage collection activities.

Returning once again to the description of the illustrated segment 104(c) where memory spaces 120(b) 120(c) and 120(d) have been marked as free space, examples of use of the free space will now be illustrated. Referring now to FIG. 2, one embodiment maintains a free list 122. The free list 122 includes a reference to a free memory space 120(b). The free memory space is linked to free memory space 120(c). The free memory space 120(c) is linked to the free memory space 120(d).

When memory needs to be allocated by an allocator for other objects, the allocator can refer to the free list 122 to identify free memory space that is of a size sufficient to contain an object for which the allocator is attempting to allocate memory space. In the example shown, because free memory spaces 120(b) and 120(c) are adjacent to each other, an object may be sized to fit in all or a portion of the combined space of free memory spaces 120(b) and 120(c).

In many typical systems, it may be necessary to prevent other garbage collection threads from performing activities on the entire large object heap 102 while the allocator is allocating memory space. However, some embodiments described herein include functionality for limiting the amount of time other threads are prevented from performing activities, and limiting the scope of memory on which activities are prevented.

Referring now to FIG. 2, a number of method act are illustrated in a method 200. The acts illustrated in FIG. 2 may be performed, for example, in a computing environment, where the computing environment includes programmatic code allowing a plurality of threads to be configured to perform allocation and garbage collection functionality for allocating memory and for freeing memory for use for other objects. The method acts may allow, for example, different threads to perform concurrent allocation and garbage collection such that a thread can perform allocation tasks on memory for an object while allowing other threads to perform garbage collection tasks are being performed on the memory. FIG. 2 illustrates an act of locking an object (act 202). This may be performed, for example, at an allocator thread by reserving memory for a first object. Reserving memory for the first object includes indicating that the memory for first object is locked or inaccessible. Indicating that the memory is locked or inaccessible may be performed in a number of different ways. For example, in one embodiment, a bit may be set in a header (e.g. header 108 in FIG. 1) of the object indicating that the object is inaccessible. Alternatively, a table of inaccessible objects may be maintained that should be consulted prior to attempting to access an object. If the object appears on the table of inaccessible objects, such as by reference to the memory address where the object begins, then garbage collection activities may be suspended until the object is removed from the table of inaccessible objects. Embodiments may be implemented where the table is a sorted table. In other embodiments the table may be a hash table. Other appropriate tables may be used as well. Locking may be performed by calling a locking API provided by a system garbage collector.

The method 200 further illustrates an act of indicating memory size of an object (act 204). This may occur, for example, at the allocator thread providing an indication of memory size for the memory for the first object. The indication of memory size may be done by indicating a size in a header, such as the headers 108 (see FIG. 1), of an object, such as objects 106 (see FIG. 1). Alternatively, size may be stored in separate tables, lists, or in other locations. Providing an indication of memory size for the memory for the first object may include indicating a beginning address and size of memory. In an alternative embodiment, providing an indication of memory size for the memory for the first object may include indicating a beginning address and an ending address.

The method 200 further illustrates an act of indicating a specialized type of the object (act 206). For example, at the allocator thread, an indication may be provided of a first type of the first object. The first type is a specialized type indicating that the object has no references to other objects. As will be explained in more detail below, this will allow garbage collectors to mark the first object, but not attempt to follow any references. If the garbage collectors attempted to access references (e.g. references 110 in FIG. 1) or data members (such as data members 112 in FIG. 1) an access violation would occur. Thus, the specialized type designation allows garbage collectors to access the object without causing an access violation. Indicating that the object is a specialized type may be performed, for example by setting a flag in a header (e.g. header 108 in FIG. 1) indicating the specialized type. Alternatively, a specialized type may be defined and a designator in a header may be used to indicate that an object is of the specialized type.

The method 200 further includes an act of unlocking the object (act 208). Activities related to this are sometimes referred to herein as publishing the object or indicating that the object is well formed. This may be accomplished by, in some examples, clearing a set bit in the header of the object or by removing the object from a table of inaccessible objects. Now continuing with the example presently being illustrated, unlocking the object may be performed by at the allocator thread, after the indication of memory size is provided, indicating that the memory for the first object is well formed, so as to unlock the memory and to make the memory accessible. Unlocking the object may be performed by calling a publish object API supplied by a system garbage collector.

At this point, it should be noted that while there may not be enough information for user threads to access the object, there is enough information about the object to allow other garbage collection threads to do some operations on the object. Specifically, FIG. 2 illustrates that other garbage collector activities are performed as illustrated at 210. For example, as described above, due to an overflow condition or an examination of the large object heap to discover dirty objects, a garbage collection may be performing a linear examination of the large object heap. During the linear examination, a garbage collection thread, may attempt to access the object. Attempting to access the object includes accessing the indication of the object size. The garbage collection thread jumps past the memory for the first object based the accessed size. These activities, as illustrated in FIG. 2 may occur between unlocking the object (act 208) and locking the object again (act 212) as will be discussed in more detail below.

FIG. 2 also illustrates an act of clearing the memory of the object (act 210). This may be performed after unlocking the object (act 208) and in some embodiments before locking the object again (act 212) as is illustrated in FIG. 2. In one embodiment, this may be performed at the allocator thread, after indicating that the memory for the first object is well formed. In particular, clearing the memory may include writing data, such as all zeros or all ones to the memory to clean the memory of any data that may have been previously stored in the memory.

FIG. 2 further illustrates an act of locking the object (act 212). This round of locking and unlocking (as illustrated at act 216) may be performed to modify the object to the state that the allocator originally intended it to be. In particular, the intended class information for the object may be installed. Locking the object (act 212) may be performed by, for example, at the allocator thread, after clearing the memory, reserving the memory for the first object again so as to facilitate assigning an appropriate type to the memory for the first object. Reserving the memory for the first object includes indicating that the memory for first object is locked. Locking may be performed in the same fashion as described above for act 202. In fact, locking the object may be performed by calling an application program interface (API) specifically intended to perform locking activities, such as setting bits or generating table entries. The same API may be used at both act 202 and act 212 to perform the locking activities.

FIG. 2 further illustrates an act of installing class information (act 214). This may be the class information for which the object was originally intended. For example, a user thread may have requested a class of a certain type. This type information can be applied during this installation of class information. In one embodiment, installing class information may include, at the allocator thread installing class information, including assigning object size and an actual type for the object.

FIG. 2 further illustrates an act of unlocking the object (act 216). For example, at the allocator thread, after the indication of memory size is provided, acts may be performed to indicate that the memory for the first object is well formed, such that the memory is unlocked. Unlocking may be performed in the same fashion as described above for act 208. In some embodiments, unlocking the object may be performed by calling an API specifically intended to perform unlocking activities, such as clearing bits or removing table entries. The same API may be used at both act 208 and act 216 to perform the unlocking activities.

The method 200 further illustrates an act of returning the object (act 218). For example, the object may be returned for use by other garbage collection and non-garbage collection threads. This allows other threads to access data, change data, add references, and to generally perform appropriate activities on the object as illustrated at 220.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, wherein the computing environment comprises programmatic code allowing a plurality of threads to be configured to perform one or more of allocation or garbage collection functionality for allocating memory or freeing memory for use for other objects, a method of allowing different threads to perform concurrent allocation and garbage collection functions such that a thread can perform allocation tasks on memory for an object while allowing other threads to perform garbage collection tasks on the memory for the object, the method comprising:
   at an allocator thread, reserving memory for a first object, wherein reserving memory for the first object comprises indicating that the memory for first object is locked;
   at the allocator thread, providing an indication of memory size for the memory for the first object;
   at the allocator thread, providing an indication of a first type of the first object, the first type being a specialized type indicating that the object has no references to other objects;
   at the allocator thread, after the indication of memory size is provided, indicating that the memory for the first object is well formed, whether or not the first object is well formed in the memory, so as to unlock the memory;
   at a different garbage collection thread, attempting to access the object, wherein attempting to access the object comprises accessing the indication of the first type and the indication of memory size;
   at the different garbage collection thread, jumping past the memory for the first object based the accessed size.

2. The method of claim 1, further comprising:
   after indicating that the memory for the first object is well formed, at the allocator thread, reserving the memory for the first object again so as to facilitate assigning an appropriate type to the memory for the first object, wherein reserving the memory for the first object comprises indicating that the memory for first object is locked;
   at the allocator thread installing class information, including assigning a second type for the object, the second type being an intended type for which the object was created;
   at the allocator thread, after the indication of memory size is provided, indicating that the memory for the first object is well formed again, such that the memory is unlocked; and
   returning the object for use by garbage collection and other non-garbage collection threads.

3. The method of claim 2, further comprising, after the first act of indicating that the memory for the first object is well formed, and before the act of reserving the memory for the first object again, clearing the memory.

4. The method of claim 1, wherein providing an indication of memory size for the memory for the first object comprises providing an indication of memory size in an external list.

5. The method of claim 1, wherein providing an indication of memory size for the memory for the first object comprises providing an indication of memory size in a header of the memory.

6. The method of claim 1, wherein providing an indication of memory size for the memory for the first object comprises indicating a beginning address and size of memory.

7. The method of claim 1, wherein providing an indication of memory size for the memory for the first object comprises indicating a beginning address and an ending address.

8. The method of claim 1, wherein reserving memory for a first object comprises inserting a reference to the memory in a table.

9. The method of claim 8, wherein the table comprises a sorted table.

10. The method of claim 8, wherein the table comprises a hash table.

11. The method of claim 1, wherein reserving memory for a first object comprises setting a flag.

12. In a computing environment, wherein the computing environment comprises programmatic code allowing a plurality of threads to be configured to perform one or more of allocation or garbage collection functionality for allocating memory or freeing memory for use for other objects, a method of allowing different threads to perform concurrent allocation and garbage collection functions such that a thread can perform allocation tasks on memory for an object while allowing other threads to perform garbage collection tasks on the memory for the object, the method comprising:

at an allocator thread, reserving memory for a first object, wherein reserving memory for the first object comprises indicating that the memory for first object is locked;

at the allocator thread, providing an indication of memory size for the memory for the first object;

at the allocator thread, providing an indication of a first type of the first object, the first type being a specialized type indicating that the object has no references to other objects; at the allocator thread, after the indication of memory size is provided, indicating that the memory for the first object is well formed, whether or not the first object is well formed in the memory, so as to unlock the memory;

at the allocator thread, after indicating that the memory for the first object is well formed, clearing the memory;

at the allocator thread, after clearing the memory, reserving the memory for the first object again so as to facilitate assigning an appropriate type to the memory for the first object, wherein reserving the memory for the first object comprises indicating that the memory for first object is locked;

at the allocator thread installing class information, including assigning object size and a second type for the object, the second type being a type for which the object was originally intended;

at the allocator thread, after the indication of memory size is provided, indicating that the memory for the first object is well formed, such that the memory is unlocked; and returning the object for use by garbage collection and other non-garbage collection threads.

13. The method of claim 12, wherein providing an indication of memory size for the memory for the first object comprises providing an indication of memory size in a header of the memory.

14. The method of claim 12, wherein providing an indication of memory size for the memory for the first object comprises indicating a beginning address and size of memory.

15. The method of claim 12, wherein providing an indication of memory size for the memory for the first object comprises indicating a beginning address and an ending address.

16. The method of claim 12, wherein reserving memory for a first object comprises inserting a reference to the memory in a table.

* * * * *